(12) United States Patent
Tosi et al.

(10) Patent No.: US 8,714,239 B2
(45) Date of Patent: May 6, 2014

(54) FLOW-INDUCED ELECTROSTATIC POWER GENERATOR FOR DOWNHOLE USE IN OIL AND GAS WELLS

(76) Inventors: Luis Phillipe Tosi, Houston, TX (US); H. Mitchell Cornette, Houston, TX (US); Carol Ann Cornette, legal representative, Houston, TX (US); David R. Underdown, Conroe, TX (US)

( * ) Notice: Subject to any disclaimer, the term of this patent is extended or adjusted under 35 U.S.C. 154(b) by 281 days.

(21) Appl. No.: 13/094,954

(22) Filed: Apr. 27, 2011

(65) Prior Publication Data

US 2012/0273234 A1 Nov. 1, 2012

(51) Int. Cl.
*E21B 43/00* (2006.01)

(52) U.S. Cl.
USPC .......................................... 166/65.1; 166/381

(58) Field of Classification Search
USPC ................................................ 166/381, 65.1
See application file for complete search history.

(56) References Cited

U.S. PATENT DOCUMENTS

| | | |
|---|---|---|
| 3,301,327 A | 1/1967 | Paton et al. |
| 4,215,426 A | 7/1980 | Klatt |
| 4,223,241 A | 9/1980 | Paszyc et al. |
| 4,771,408 A | 9/1988 | Kotlyar |
| 5,189,012 A | 2/1993 | Patel et al. |
| 5,222,049 A | 6/1993 | Drumheller |
| 5,381,863 A | 1/1995 | Wehner |
| 5,740,860 A | 4/1998 | Crawford et al. |
| 6,034,037 A | 3/2000 | Van Slyke |
| 6,421,298 B1 | 7/2002 | Beattie et al. |
| 6,766,141 B1 | 7/2004 | Briles et al. |
| 7,530,737 B2 | 5/2009 | Thompson et al. |
| 7,636,052 B2 | 12/2009 | Coates et al. |
| 7,858,564 B2 | 12/2010 | Pasquier et al. |
| 2006/0053869 A1* | 3/2006 | Gysling et al. ............... 73/61.44 |
| 2008/0061789 A1 | 3/2008 | Coates et al. |
| 2009/0031796 A1 | 2/2009 | Coates et al. |
| 2010/0075184 A1* | 3/2010 | Chen et al. ....................... 429/17 |
| 2011/0210645 A1* | 9/2011 | Mason ........................... 310/309 |

OTHER PUBLICATIONS

Abedian et al., "Theory for Electric Charging in Turbulent Pipe Flow," Journal of Fluid Mechanics, vol. 120, pp. 199-217, 1982.
Abedian et al., "Electric Currents Generated by Turbulent Flows of Liquid Hydrocarbons in Smooth Pipes: Experiment vs. Theory," Chemical Engineering Science, vol. 41(12), pp. 3183-3189, 1986.
Huber et al., "Theory for Electric Charging in Liquid Hydrocarbon Filtration," Journal of Colloid and Interface Science, vol. 62(1), pp. 109-125, 1977.
Huber et al., "Electrostatic Charging in Liquid Hydrocarbon Filtration: A Comparison of Theory and Experiments," Journal of Colloid and Interface Science, vol. 62(1), pp. 126-145, 1977.

\* cited by examiner

*Primary Examiner* — Brad Harcourt
(74) *Attorney, Agent, or Firm* — Edward Mickelson; Parul Anderson (57) ABSTRACT

The present invention is directed to processes (methods) for harnessing flow-induced electrostatic energy in an oil and/or gas well and using this energy to power electrical devices (e.g., flowmeters, electrically-actuated valves, etc.) downhole. The present invention is also directed to corresponding systems through which such methods are implemented.

20 Claims, 6 Drawing Sheets

FLOW-INDUCED ELECTROSTATIC POWER GENERATOR FOR DOWNHOLE USE IN OIL AND GAS WELLS

FIELD OF THE INVENTION

The field of the present invention can be seen as being that of methods and systems generally directed to harnessing electrostatic energy, and specifically to utilizing flow-induced electrostatic energy to power electrical devices in the subterranean environment of an oil and/or gas well.

BACKGROUND

Oil and gas wells have significant downhole electrical power needs. Pumps, valves, sensors, and the like—all require power to function. This power can be consumed continuously and/or in discrete intervals. This power is typically supplied to a downhole well environment via tubing encapsulated cable (from the surface) or in situ via batteries. Unfortunately, either scenario requires the frequent insertion and removal of equipment from the well which, in turn, leads to a reduction in efficiency.

Regarding above-mentioned cabled power scenarios, there are significant reliability concerns—particularly around the breakage of long lengths of cable. Additionally, cables require holes in the packers, which can correspondingly decrease the pressure rating of any such packer through which they pass.

In terms of such above-mentioned battery-powered scenarios, batteries utilized for such purposes will invariably have a finite life, thereby requiring intervention when they fail. Associated intervention costs and protocols would typically entail running wireline down the well to change out the batteries, which in turn would likely result in lost production time (i.e., production would likely have to be halted).

In view of the foregoing, new methods and/or systems by which electrical power can be generated (and used) downhole would be extremely useful—particularly wherein it reduces the frequency in which equipment is inserted and/or removed from the well.

BRIEF DESCRIPTION OF THE INVENTION

The present invention is directed to processes (i.e., methods, the two terms being used interchangeably herein) for harnessing flow-induced electrostatic energy in an oil and/or gas well and using this energy to power electrical devices (e.g., flowmeters, electrically-actuated valves, sliding sleeves, etc.) downhole (i.e., in the well, at depth). The present invention is also directed to corresponding systems through which such methods are (or can be) implemented. Methods and systems will each be generally characterized as being of either a first type or a second type, depending upon how the electrostatic energy is developed within the well.

In some embodiments, the present invention is directed to methods (of a first type) of powering devices in a petroleum well through the generation of electrostatic energy downhole, the petroleum well originating at a geological surface, having variable or non-variable orientation along the length of the well, and comprising a plurality of tubular segments disposed therewithin and connected in series along the well length, said method comprising the steps of: (a) flowing a substantially non-conductive hydrocarbon-based fluid, as a flowstream, through a designated tubular length that is electrically-isolated from adjacent tubular segments to which it is connected, wherein the non-conductive hydrocarbon-based fluid has a relative permittivity of between 2 and 40; (b) generating a net, steady-state electrostatic potential between the flowstream and said designated tubular length; (c) harvesting electrical energy from the electrostatic potential via a ground electrode in electrical contact with the flowstream and an electrical lead in electrical contact with the designated tubular length; and (d) using the electrical energy harvested in Step (c) to power one or more devices downhole.

In some embodiments, the present invention is directed toward systems of a first type, such systems being operable for powering devices in a petroleum well through the generation of electrostatic energy downhole and generally comprising: a wellbore originating at a geological surface and extending from said surface into a geological formation; a plurality of tubular segments disposed within the wellbore, wherein said tubular segments are useful in conveying hydrocarbon-based fluids out of said wellbore; at least one electrically-isolated tubular segment that is electrically isolated from any adjoining segments (e.g., via insulation or electrically-insulating surface coatings), wherein said electrically-isolated tubular segment includes a high friction surface on its interior; at least one device-bearing tubular segment comprising at least one device that can be usefully employed downhole; at least one electrical lead establishing connectivity between the at least one electrically-isolated tubular segment and the at least one device-bearing tubular segment; a flow of substantially non-conductive hydrocarbon-based fluid, wherein said flow is directed through the tubular segments in an upward direction toward the surface; a ground electrode extending into the flow, wherein an electrical potential exists between the flow and the interior of the electrically-isolated tubular segment, and wherein this electrical potential is harnessed to power at least one device in the at least one device-bearing tubular segment.

In some embodiments the present invention is directed to methods (of a second type) of powering devices in a petroleum well through the generation of electrostatic energy downhole, the petroleum well originating at a geological surface and being operable for the production of oil, natural gas, or mixtures thereof, said methods generally comprising the steps of: (a') flowing a substantially non-conductive hydrocarbon-based fluid, as a flowstream, through a substantially insulating membrane; (b') generating a net, steady-state electrostatic potential between the flowstream and said membrane, wherein the membrane comprises a plurality of flow channels through which the substantially non-conductive hydrocarbon-based fluid can pass, and wherein at least a majority of said flow channels have an effective diameter of at least about 500 nm and at most about 200 μm; (c') harvesting electrical energy from the electrostatic potential via a ground electrode in electrical contact with the flowstream and an electrical lead in electrical contact with the membrane; and (d') using the electrical energy harvested in Step (c') to power one or more devices downhole.

In some embodiments, the present invention is directed to systems of a second type for powering devices in a petroleum well through the generation of electrostatic energy downhole, wherein such systems (of a second type) generally comprise the following: a wellbore originating at a geological surface, extending from said surface into a geological formation; a plurality of tubular segments disposed within the wellbore, wherein said tubular segments are useful in conveying hydrocarbon-based fluids out of said wellbore; at least one membrane-bearing tubular segment comprising: (i) an electrically-grounded outer upstream membrane electrode, (ii) an inner downstream membrane electrode, (iii) a dielectric filter membrane, comprising flow channels, disposed between the inner and outer membrane electrodes wherein at least a majority of said flow channels have an effective diameter of at least about 500 nm and at most about 200 µm; at least one device-bearing tubular segment comprising at least one device that can be usefully employed downhole; at least one electrical lead establishing connectivity between the inner downstream membrane electrode and the at least one device-bearing tubular segment; a flow of substantially non-conductive hydrocarbon-based fluid, wherein said flow is directed through the tubular segments in an upward direction toward the surface; wherein an electrical potential exists between the electrically-grounded outer upstream membrane electrode and the inner downstream membrane electrode, and wherein this electrical potential is harnessed to power at least one device in the at least one device-bearing tubular segment.

In some embodiments, methods and/or systems of either a first or second type are further coupled with a wireless communication subsystem (or a step of wirelessly communicating) for wirelessly conveying, to the surface, data obtained by the devices being wirelessly powered by harnessed electrostatic energy, as described above.

The foregoing has outlined rather broadly the features of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

1. Introduction

As mentioned in the foregoing section, the present invention is directed to processes (i.e., methods) for harnessing flow-induced electrostatic energy in an oil and/or gas well and utilizing this energy to power electrical devices downhole (i.e., in the wellbore). The present invention is also directed to corresponding or otherwise associated systems through which such methods are implemented. Methods and systems will generally be characterized as being of either a first type or a second type, the details of which are described below.

2. Methods of a First Type

Figure 1:
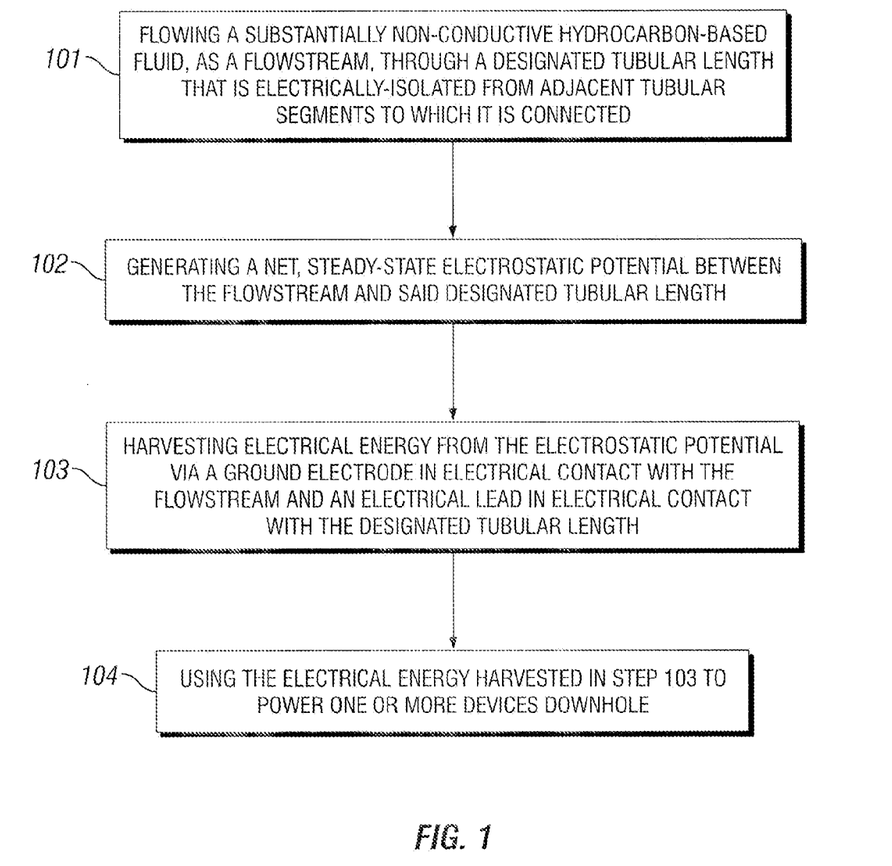
FIG. 1 illustrates, in flow diagram form, methods of a first type for generating electrostatic energy downhole for the purpose of powering devices in a petroleum well, in accordance with some embodiments of the present invention.

With reference to FIG. 1, in some embodiments the present invention is directed to one or more methods of powering devices in a petroleum well through the generation of electrostatic energy downhole, the petroleum well originating at a geological surface, having variable or non-variable orientation along the length of the well, and comprising a plurality of tubular segments disposed therewithin and connected in series along the well length, said method comprising the steps of: (Step 101) flowing a substantially non-conductive hydrocarbon-based fluid, as a flowstream, through a designated tubular length that is electrically-isolated from adjacent tubular segments to which it is connected (either in series or in parallel), wherein the non-conductive hydrocarbon-based fluid has a relative permittivity of between 2 and 40; (Step 102) generating a net, steady-state electrostatic potential between the flowstream and said designated tubular length; (Step 103) harvesting electrical energy from the electrostatic potential via a ground electrode (typically in the path of the flowstream) in electrical contact with the flowstream and an electrical lead in electrical contact with the designated tubular length; and (Step 104) using the electrical energy harvested in Step 103 to power one or more devices downhole. Depending on the embodiment, the tubular segments may comprise joints, coiled tubing, or combinations thereof.

Generally, in such above-described method embodiments, the petroleum well is operable for producing hydrocarbons (oil, gas, or combinations thereof) from the subsurface, and this production of hydrocarbons can take place on either land or offshore (incl. >200 meters deep waters, referred to herein as "deepwater"). Additionally, such wells can be of a variety of types including, but not limited to, vertical and/or deviated wells, cased and/or open-hole wells, multilateral wells, and combinations of any or all of the foregoing.

In some such above-described embodiments, the substantially non-conductive hydrocarbon-based fluid is a completion fluid, although drilling fluids, workover fluids, and produced fluids can be similarly utilized (vide infra). Non-conductive hydrocarbon-based completion fluids are known in the art. By way of illustration and not limitation, examples of non-conductive hydrocarbon-based completion fluids can be found in Pasquier et al., U.S. Pat. No. 7,858,564, issued Dec. 28, 2010; and Patel et al., U.S. Pat. No. 5,189,012, issued on Feb. 23, 1993.

In some such embodiments, the substantially non-conductive hydrocarbon-based fluid is selected from the group consisting of (a) an injected fluid, (b) a produced fluid, and (c) combinations thereof. By way of illustration and not limitation, examples of non-conductive hydrocarbon-based injection fluids can be found in Patton et al., U.S. Pat. No. 3,301,327, issued Jan. 31, 1967. Produced fluids would naturally be the oil and/or gas being extracted from the reservoir, and perhaps comprising amounts of injection fluid (if such fluid was used). In enhanced oil recovery (EOR) operations, it is contemplated that electrostatic energy could be produced, and subsequently harnessed, during either or both of injection and production operations.

In some such embodiments, the non-conductive hydrocarbon-based flowstream flows past the designated tubular length in a direction parallel to the path of the well. Naturally, such flowstreams can be directed toward the surface or away from it, depending upon whether the flowstream comprises a produced fluid or an injection fluid. In some "huff-n-puff" enhanced oil recovery (EOR) applications, the flowstream can be cycled in both directions in the same well.

In some such above-described method embodiments, the non-conductive hydrocarbon-based flowstream flows past the designated tubular length in a side-pocket mandrel assembly providing for a diverted flowpath. In such embodiments, the diverted flow can be used to generate electrostatic energy, while not impeding flow (or offering only minimal fluid flow impedance) of fluids in the primary conduit through which they are transported. See Crawford et al., U.S. Pat. No. 5,740,860, issued Apr. 21, 1998, for an example of how a side-pocket mandrel can be integrated with a production string.

In some embodiments, the designated tubular length presents itself to the flowstream as a coating of a first type. In some such embodiments, the coating of a first type is substantially non-conductive. Exemplary such coating of a first type include, but are not limited to, material selected from the group consisting of polytetrafluoroethylene (PTFE), polyamides (Nylon), polyimides, polyvinylchloride (PVC), polyolefins, polyesters, and combinations thereof. Such coatings can be made with a range of uniformity and a variety of thicknesses, the latter often being dependent on the durability of the coating material and/or its "adhesiveness" to the tubular segment of which it is part. Such coatings can also be multi-layered.

In some embodiments, regardless of the material of the coating (if any), the designated tubular length comprises a rough-textured surface on at least a portion of its interior surface, wherein the rough-textured surface has an average roughness ($R_a$) of generally between about 100 nanometers (nm) and about 2.5 millimeters (mm), typically between about 5 micrometers (μm) and about 1 mm, and more typically between about 5 μm and about 250 μM. Such rough-texturing of the interior surface can increase surface area and/or increase the fluid flow impedance—thereby enhancing the buildup of electrical charge.

In some embodiments, the designated tubular length is electrically-isolated from adjacent tubular segments to which it is connected by means of a substantially-insulating coating of a second type about at least the regions that are in mechanical contact with the adjacent tubular segments. The coating of a second type can be of the same or different from the coating of the first (vide supra), provided of course that it is electrically-insulating. Such coatings of a second type can be continuous with that of the first type provided they are of the same material. Exemplary such coating of a second type include, but are not limited to, material selected from the group consisting of polytetrafluoroethylene (PTFE), polyamides (Nylon), polyimides, polyvinylchloride (PVC), polyolefins, polyesters, and combinations thereof.

In some such embodiments, the net, steady-state electrostatic potential is generally at least about 5 microvolts (μV) and at most about 500 kilovolts (kV), typically at least about 0.5 millivolts (mV) to at most about 100 kV, and more typically at least about 2 mV to at most about 50 kV. There is precedent for such flow-induced electrostatic potentials; see, e.g., Paszyc et al., U.S. Pat. No. 4,223,241, issued on Sep. 16, 1980.

The device deriving power from the harvested electrical energy is not particularly limited. Undoubtedly, it will have some utility downhole and be fabricated to withstand the environmental conditions to which it is exposed. Notwithstanding such aforementioned flexibility, in some embodiments the device deriving power from the harvested electrical energy is selected from the group consisting of one or more of the following: a pressure sensor, a temperature sensor, a sliding sleeve, a valve, telemetry electronics, flow meter, fluid sensing device, and combinations thereof. Additionally or alternatively, in some embodiments, the device draws power from an electrical storage device (e.g., one or more batteries and/or a capacitor or bank thereof) that is, in turn, charged by the harvested electrical energy.

In some embodiments, the substantially non-conductive hydrocarbon-based fluid is synthetically-derived and/or, comprises at least one synthetically-derived component. By way of illustration and not limitation, examples of potentially-suitable such synthetically-derived, substantially non-conductive hydrocarbon-based fluids can be found in Van Slyke, U.S. Pat. No. 6,034,037, issued Mar. 7, 2000.

In some embodiments, the electrostatic potential is generated at least about 100 meters below the well surface (for offshore wells this would be the sea floor). Regardless of where in the well the energy is created and harvested, it can be utilized to power devices that are up to hundreds of meters above/below or fore/aft the location at which it is harnessed—using electrical leads of sufficient length and durability.

3. Systems of a First Type

Systems are generally consistent with implementing the methods described above via a functional infrastructure that includes a fluid flow (as a flowstream) as a component thereof, and as described in the passages which follow. To an extent not inconsistent herewith, the various aspects and details described above for methods of a first type are applicable and suitably pertain to the systems described in this section. The reverse is also generally true: there is generally backwards applicability of system parameters with the methods described above.

Figure 2A:
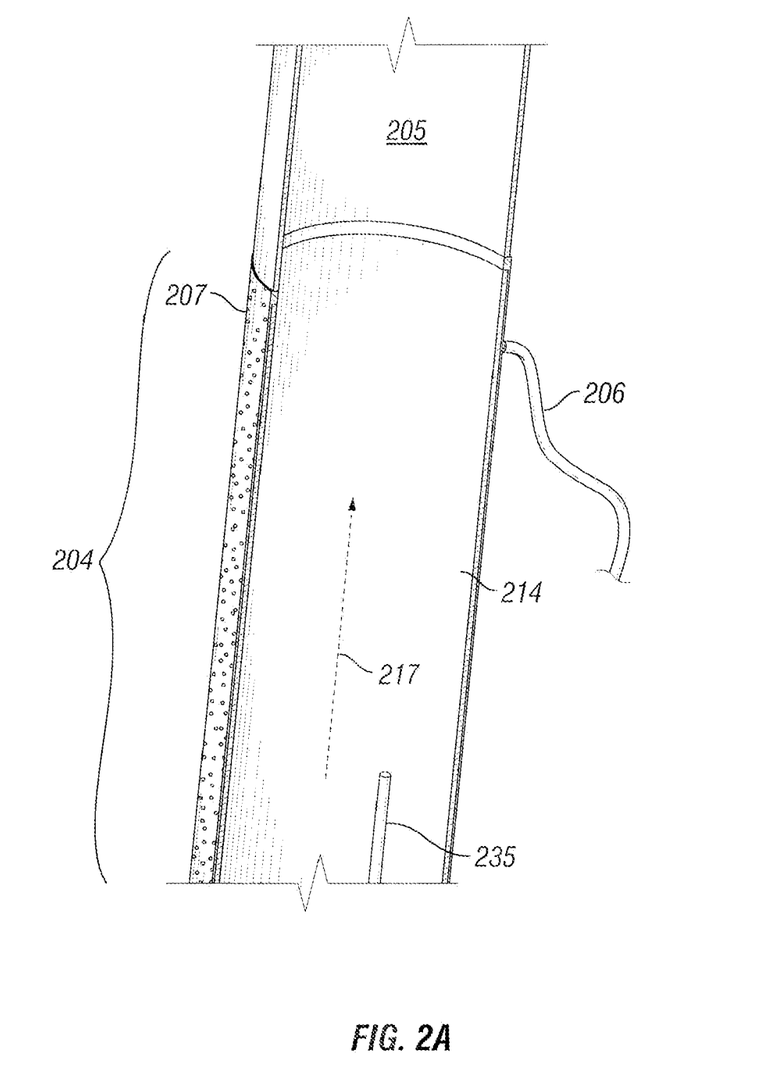
FIG. 2A depicts an electrically-isolated tubular segment of a system of a first type for generating electrostatic energy downhole for the purpose of powering devices in a petroleum well, in accordance with some embodiments of the present invention.
Figure 2B:
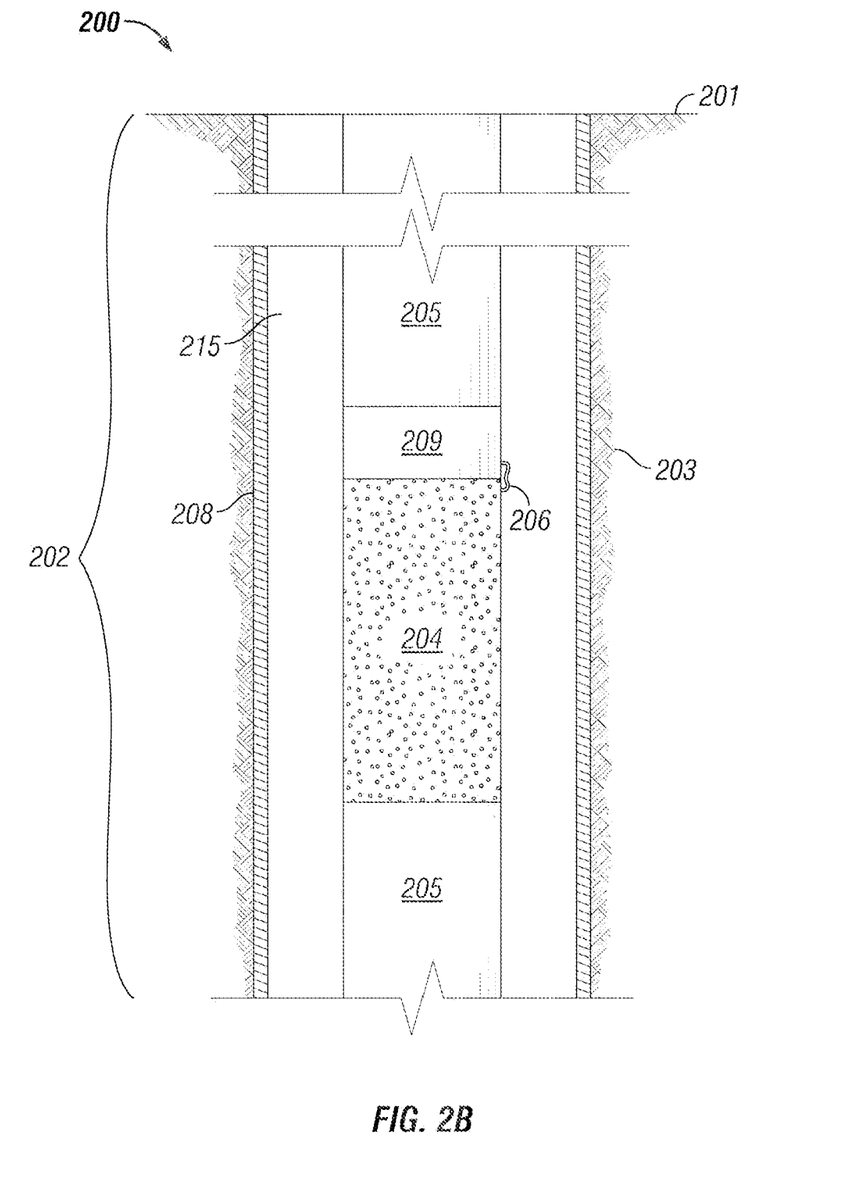
FIG. 2B depicts how the electrically-isolated tubular segment shown in FIG. 2A can be integrated with a system of a first type, in accordance with some embodiments of the present invention.

In some embodiments, and with reference to FIGS. 2A and 2B, the present invention is directed toward one or more systems of a first type, such systems 200 being operable for powering devices in a petroleum well through the generation of electrostatic energy downhole and generally comprising: a wellbore 202 originating at a geological surface 201 and extending from said surface into a geological formation 203; a plurality of tubular segments (e.g., 204, 205, 209) disposed within the wellbore, wherein said tubular segments are useful in conveying hydrocarbon-based fluids out of said wellbore; at least one electrically-isolated tubular segment 204 that is electrically isolated from any adjoining segments (via insulation 207), wherein said electrically-isolated tubular segment includes a high friction surface 214 on its interior; at least one device-bearing tubular segment 209 comprising at least one device that can be usefully employed downhole (and generally requiring power to operate); at least one electrical lead 206 establishing connectivity between the at least one electrically-isolated tubular segment 204 and the at least one device-bearing tubular segment 209; a flow of substantially non-conductive hydrocarbon-based fluid 217, wherein said flow is directed through the tubular segments in an upward direction toward the surface; a ground electrode 235 extending into the flow, wherein an electrical potential exists between the flow 217 and the interior of the electrically-isolated tubular segment 204, and wherein this electrical potential is harnessed to power at least one device in the at least one device-bearing tubular segment 209.

Generally, such above-described plurality of tubular segments 204, 205, and 209 can range in length from less than about 1 meter to well over 1000 meters. In some such embodiments, the length of the segments coincides with the length of tubing joints and/or subs. In some or other embodiments, such segments comprise a plurality of such joints and/or subs.

In some such above-described system embodiments (of a first type), the petroleum well 202 is operable for producing oil, gas, or combinations thereof. The well can be either on land or offshore (incl. deepwater), and can be of the substantially vertical type, horizontal type or otherwise deviated, or combinations thereof. In some such embodiments, the petroleum well is a multilateral well. In some such or other embodiments, the well is a cyclic injection and recovery well (i.e., a "huff-n-puff"). See, e.g., Wehner, U.S. Pat. No. 5,381,863, issued Jan. 17, 1995.

In some such above-described embodiments, the electrically-isolated tubular segment 204 exposes or otherwise presents itself to the flowstream (flow 217) as a substantially non-conductive coating comprised of a material selected from the group consisting of polytetrafluoroethylene (PTFE), polyamides (Nylon), polyimides, polyvinylchloride (PVC), polyolefins, polyesters, combinations thereof, and non-conductive polymer compositions generally—particularly those that lend themselves well to coatings. As mentioned in the case of the method claims of Section 2, such coatings can have a range of thicknesses and uniformities, and they can be multi-layered. In these or other embodiments, the coatings can additionally or alternatively be ceramic and/or metallic in composition. Additionally or alternatively still, in some embodiments no coating of the electrically-isolated tubular segment (or a portion thereof) is required.

In some such above-described embodiments, the electrically-isolated tubular segment 204 comprises a high friction surface having an average roughness ($R_a$) of generally between about 100 nm and about 2.5 mm, typically between about 5 µm and about 1 mm, and more typically between about 5 µm and about 250 µm. Such high friction (i.e., rough-textured) interior surface(s) can increase surface area and/or increase the fluid flow impedance (via increased friction)—thereby enhancing the buildup of electrical charge.

In some such above-described system embodiments, the at least one device-bearing tubular segment 209 comprises one or more devices selected from the group consisting of pressure sensors, temperature sensors, sliding sleeves, valves, telemetry electronics, flow meters, fluid sensing devices, and combinations thereof. Generally, such devices are those that require power, and which would normally obtain that power via batteries or encapsulated cable from the surface of the well.

While in many instances the powered device(s) (being integral with, or otherwise part of, the at least one device-bearing tubular segment 209) is in close proximity to the electrically-isolated tubular segment 204, this need not always be the case. In some such embodiments, the at least one electrical lead can span a distance within the wellbore of generally up to about 1000 meters, but typically no more than about 200 meters, and more typically no more than about 50 meters.

In some such above-described embodiments, the flow of substantially non-conductive hydrocarbon-based fluid 217 comprises a fluid selected from the group consisting of heptanes, diesel, crude oil, mineral oil, and combinations thereof; such fluids, however, are merely exemplary. By way of illustration and not limitation, additional examples of non-conductive hydrocarbon-based (completion fluids in this case) can be found in Pasquier et al., U.S. Pat. No. 7,858,564, issued Dec. 28, 2010; and Patel et al., U.S. Pat. No. 5,189,012, issued on Feb. 23, 1993.

In some such above-described embodiments, the flow of substantially non-conductive hydrocarbon-based fluid possesses a flow rate of generally between about 1 liter/minute and about 55,000 liters/minute, typically between about 1 liter/minute and about 10,000 liters/minute, and more typically between about 10 liters/minute and about 5,000 liters/minute. For any given system, the flow rate is generally seen to be proportional to the electric potential that develops between the flow 217 and the at least one electrically-isolated tubular segment 204. Accordingly, it is contemplated that the electric potential could be altered to a desired value by deliberately changing the flow rate. From an operational perspective, flow rate would need to be sufficient for generating a usable electrostatic potential.

In some such above-described embodiments, flow 217 is characterized as being turbulent. While not intending to be bound by theory, turbulent flow may be preferred for inducing electrostatic potentials in at least some method and system embodiments of the present invention, and perhaps particularly so for such methods and systems of a first type. See, e.g., Abedian et al., "Theory for Electric Charging in Turbulent Pipe Flow," Journal of Fluid Mechanics, vol. 120, pp. 199-217, 1982; and Abedian et al., "Electric Currents Generated by Turbulent Flows of Liquid Hydrocarbons in Smooth Pipes: Experiment vs. Theory," Chemical Engineering Science, vol. 41(12), pp. 3183-3189, 1986.

In some embodiments, such above-described systems further comprise a telemetry subsystem or means (not shown in FIGS. 2A and 2B) operable for conveying device-generated data to the surface. While not limited thereto, such systems are preferably wireless, with such wireless subsystems being more fully described in Section 6 below.

4. Methods of a Second Type

Method embodiments of a second type share significant commonality with method embodiments of a first type. The primary manner in which they differ is in how the electrostatic potential is generated: methods of a second type involve passing a substantially non-conductive hydrocarbon-based fluid through a membrane. Other aspects and/or variables of these two types of methods (and their corresponding systems) are largely the same for each.

As mentioned previously herein and with reference to FIG. 3, in some embodiments the present invention is directed to methods (of a second type) of powering devices in a petroleum well through the generation of electrostatic energy downhole, the petroleum well originating at a geological surface and being operable for the production of oil, natural gas, or mixtures thereof, said methods generally comprising the steps of: (Step 301) flowing a substantially non-conductive hydrocarbon-based fluid, as a flowstream, through a substantially insulating membrane; (Step 302) generating a net, steady-state electrostatic potential between the flowstream and said membrane, wherein the membrane comprises a plurality of flow channels through which the substantially non-conductive hydrocarbon-based fluid can pass, and wherein at least a majority of said flow channels have an effective diameter of at least about 500 nm and at most about 200 µm; (Step 303) harvesting electrical energy from the electrostatic potential via a ground electrode in electrical contact with the flowstream and an electrical lead in electrical contact with the membrane; and (Step 304) using the electrical energy harvested in Step 303 to power one or more devices downhole.

Figure 3:
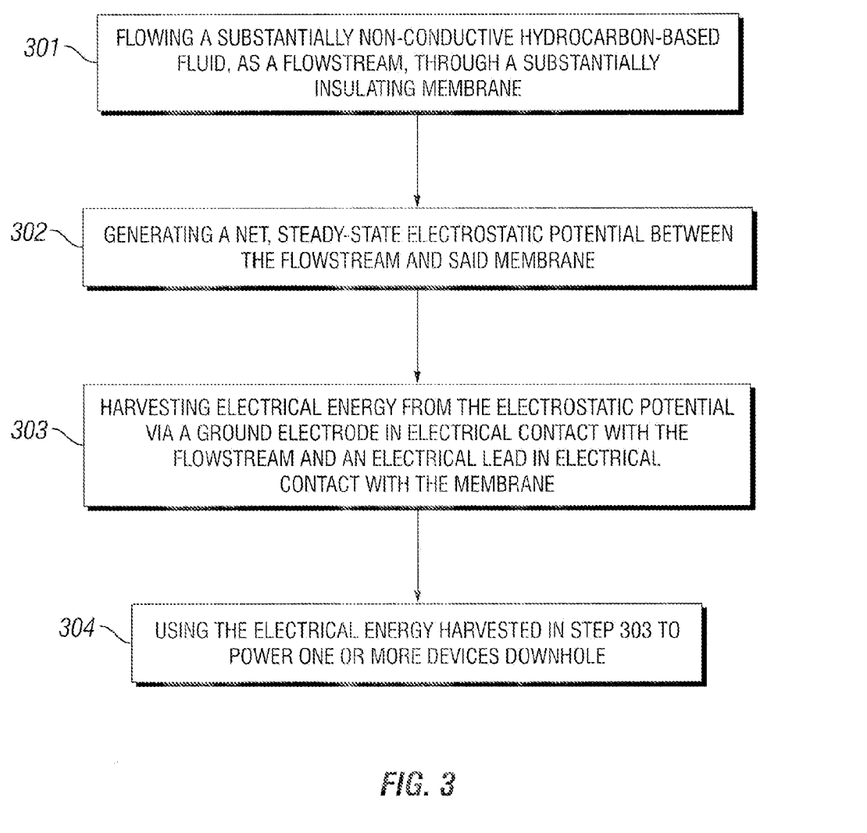
FIG. 3 illustrates, in flow diagram form, methods of a second type for generating electrostatic energy downhole for the purpose of powering devices in a petroleum well, in accordance with some embodiments of the present invention.

In some such embodiments, the substantially non-conductive hydrocarbon-based fluid is selected from the group consisting of (a) completion fluid, (b) displacement fluid, (c) drilling fluid, and (d) combinations thereof. Non-conductive hydrocarbon-based types of such fluids are known in the art. By way of illustration and not limitation, exemplary such fluids can be those used for methods of a first type (vide supra).

In some embodiments, the substantially insulating membrane is comprised of a material that is sufficiently insulating from an operational standpoint. In some such embodiments, average pore size of the membrane is generally between about 50 nm and about 50 mm, typically between about 100 nm and about 1 mm, and more typically between about 250 nm and about 250 µm. In some such embodiments, the substantially insulating membrane is comprised of a material selected from the group consisting of polytetrafluoroethylene (PTFE), polyamides (Nylon), polyimides, polyvinylchloride (PVC), polyolefins, polyesters, and combinations thereof.

The downstream electrode generally is made of a material sufficiently conductive (and durable) for it to serve as an electrode in the manner described above. Accordingly, the material of which it is comprised is not particularly limited. In some such embodiments, the downstream electrode is substantially porous so as to permit flow of fluid therethrough. In some such embodiments, average pore size of the downstream electrode is generally between about 1 µm and about 10 cm, typically between about 1 µm and about 5 cm, and more typically between about 5 µm and about 5 cm.

Like the downstream electrode, the upstream electrode is generally made of a material sufficiently conductive and durable for it to serve as an electrode in the manner described above. Accordingly, the material of which it is comprised is not particularly limited. In some such embodiments, the upstream electrode is substantially porous so as to permit flow of fluid therethrough. In some such embodiments, average pore size of the upstream (ground) electrode is generally between about 1 µm and about 10 cm, typically between about 1 µm and about 5 cm, and more typically between about 5 µm and about 5 cm. In some such embodiments, where the upstream electrode takes the form of a conductive mesh, the conductive mesh is generally of a mesh size that corresponds to grids between about 1×1 µm and about 10×10 cm, typically between about 5×5 µm and about 10×10 cm, and more typically between about 5×5 µm and about 5×5 cm. The material of which the mesh is made is not particularly limited, except that it should possess sufficient electrical conductivity, and be sufficiently robust, so as to be durably operational in the wellbore environment in which it is placed.

In some such above-described embodiments, the at least one membrane-bearing tubular segment comprises, in whole or in part, a sand control device or means. Sand control devices like sand screens are known in the art and are ubiquitously deployed in wells throughout the world. Care must be taken in selection of such devices or screens so that the material makeup and dimensional attributes of the componentry are consistent with those of the membrane-bearing tubular segment described above. Additionally or alternatively, the at least one membrane-bearing tubular segment can be constructed so as to also provide for utility as a sand control device.

In some such above-described embodiments, the net, steady-state electrostatic potential is generally at least about 5 µV and at most about 500 kV, typically at least about 0.5 mV to at most about 100 kV, and more typically at least about 2 mV to at most about 50 kV. Generally, such a potential should be sufficiently great so as to operationally-power a device downhole—even if such powering is by way of an electrical device. Accordingly, in some such embodiments, the device draws power from an electrical storage device that is, in turn, charged by the harvested electrical energy.

In some such embodiments, the device deriving power from the harvested electrical energy is selected from the group consisting of one or more of the following: a pressure sensor, a temperature sensor, a sliding sleeve, a valve, telemetry electronics, flow meter, fluid sensing device, and combinations thereof.

5. Systems of a Second Type

Systems of a second type are generally consistent with implementing one or more methods (of a second type) as described above via a functional infrastructure, and as described in the passages which follow. Additionally, system embodiments of a second type share significant commonality with system (and method) embodiments of a first type. The primary manner in which they differ is in how the electrostatic potential is generated: systems of a second type involve passing a substantially non-conductive hydrocarbon-based fluid through a membrane assembly in a membrane-bearing tubular segment (vide infra). Other aspects and/or variables of these two types of systems (and their corresponding methods) are largely the same for each.

Figure 4A:
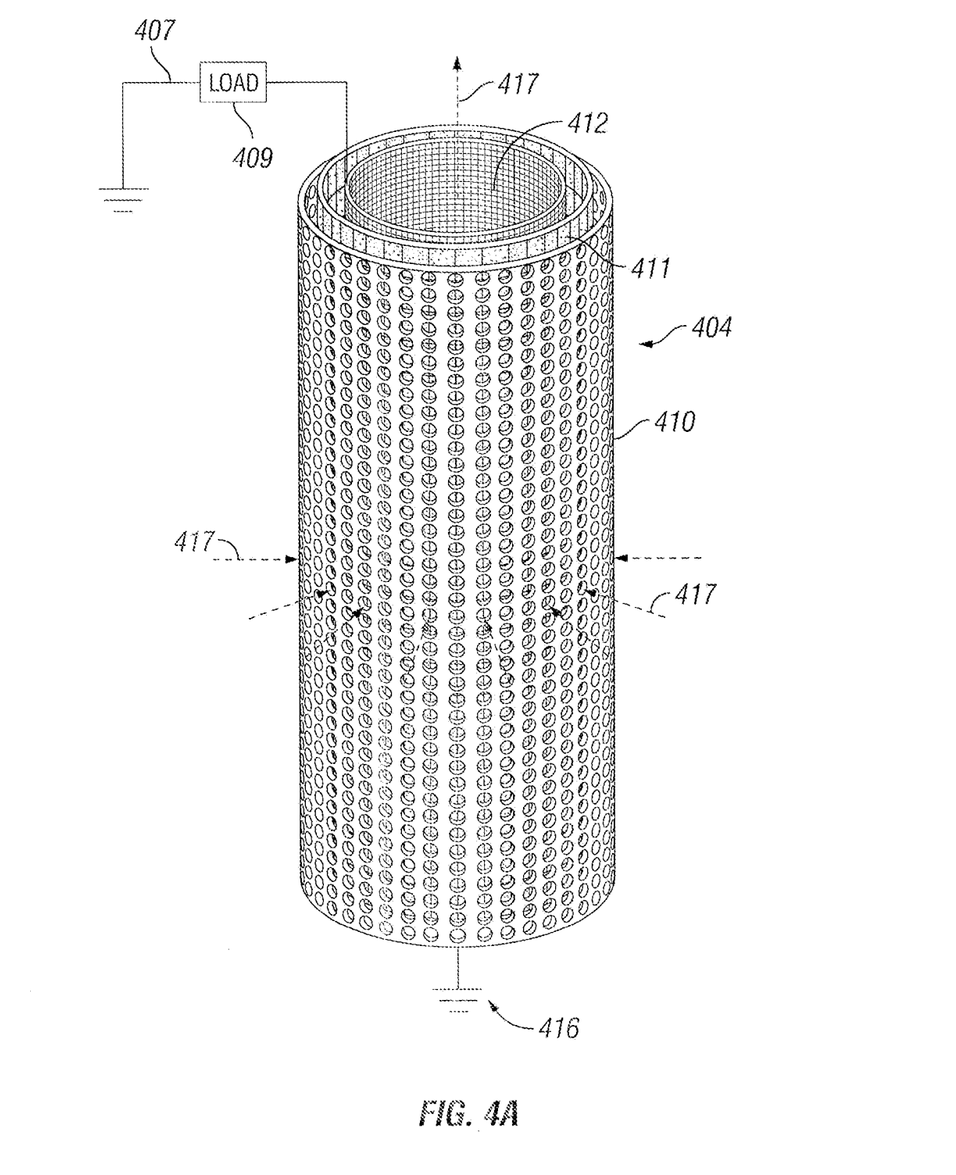
FIG. 4A depicts a portion of a membrane-bearing tubular segment of a system of a second type for generating electrostatic energy downhole for the purpose of powering devices in a petroleum well, in accordance with some embodiments of the present invention.
Figure 4B:
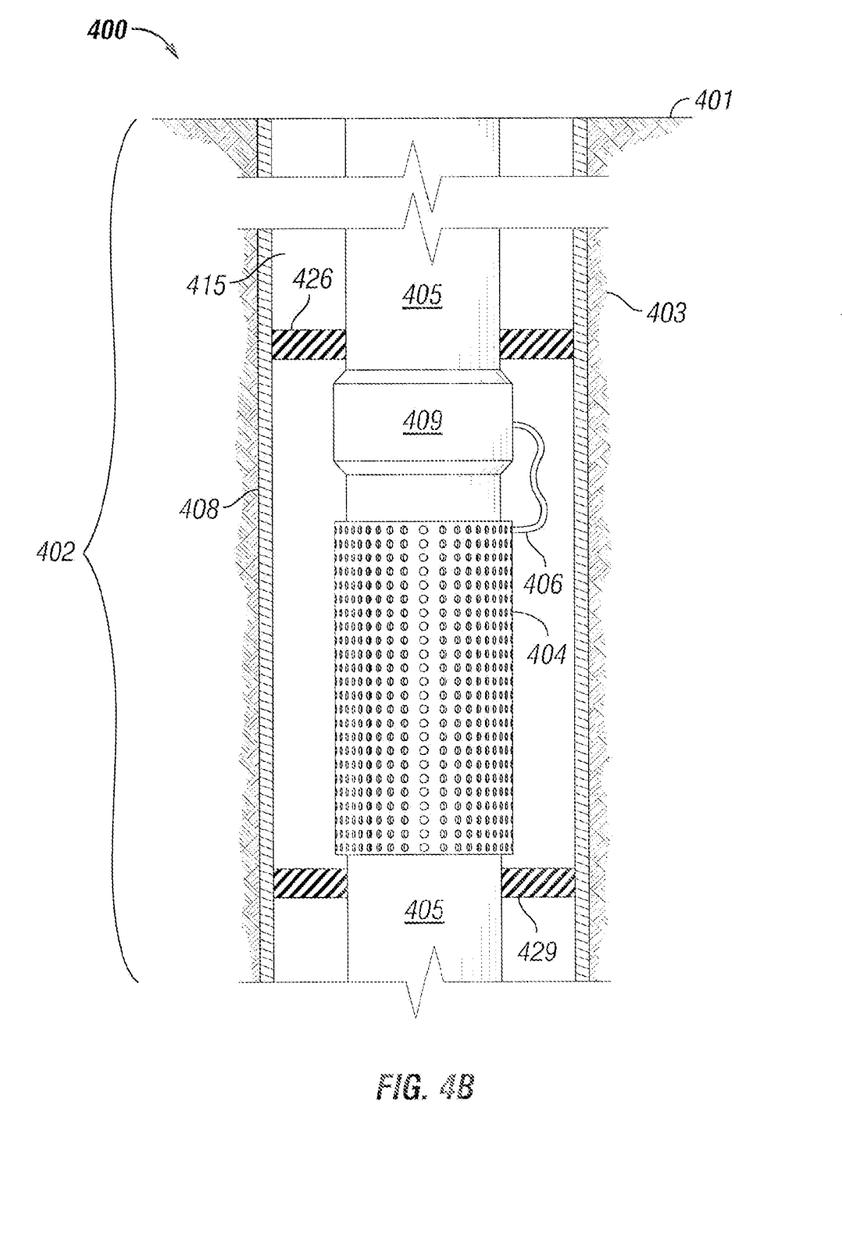
FIG. 4B depicts how the membrane-bearing tubular segment shown in FIG. 4A can be integrated with a system of a second type, in accordance with some embodiments of the present invention.

Referring to FIGS. 4A and 4B, such systems (of a second type), for powering devices in a petroleum well through the generation of electrostatic energy downhole, generally comprise (as system 400) the following: a wellbore 402 originating at a geological surface 401, extending from said surface into a geological formation 403; a plurality of tubular segments (e.g., 404, 405, 409) disposed within the wellbore, wherein said tubular segments are useful in conveying hydrocarbon-based fluids out of said wellbore; at least one membrane-bearing tubular segment 404 comprising: (i) an electrically-grounded outer upstream membrane electrode 410, (ii) an inner downstream membrane electrode 412, (iii) a dielectric filter membrane 411, comprising flow channels, disposed between the inner and outer membrane electrodes wherein at least a majority of said flow channels have an effective diameter of at least about 500 nm and at most about 200 µm; at least one device-bearing tubular segment 409 comprising at least one device that can be usefully employed downhole; at least one electrical lead 406 establishing connectivity between the inner downstream membrane electrode and the at least one device-bearing tubular segment; a flow 417 of substantially non-conductive hydrocarbon-based fluid, wherein said flow is directed through the tubular segments in an upward direction toward the surface; wherein an electrical potential exists between the electrically-grounded outer upstream membrane electrode 410 and the inner downstream membrane electrode 412, and wherein this electrical potential is harnessed to power at least one device in the at least one device-bearing tubular segment 409.

While not intending to be bound by theory, rigorous theoretical treatment of electrostatic charging during filtration has been undertaken previously. See, e.g., Huber et al., "Theory for Electric Charging in Liquid Hydrocarbon Filtration," Journal of Colloid and Interface Science, vol. 62(1), pp. 109-125, 1977; Huber et al., "Electrostatic Charging in Liquid Hydrocarbon Filtration: A Comparison of Theory and Experiments," Journal of Colloid and Interface Science, vol. 62(1), pp. 126-145, 1977.

In some such above-described embodiments, the petroleum well is operable for producing oil, gas, or combinations thereof. In some embodiments, the petroleum well is a multilateral well. The well can be either on land or offshore (incl. deepwater), and can of the substantially vertical type, horizontal type or otherwise deviated, or combinations thereof. In some such embodiments, the petroleum well is a multilateral well. In some such or other embodiments, the well is a cyclic injection and recovery well (i.e., a "huff-n-puff"). See, e.g., Wehner, U.S. Pat. No. 5,381,863, issued Jan. 17, 1995.

In some such above-described embodiments, the at least one device-bearing tubular segment 409 comprises one or more devices selected from the group consisting of pressure sensors, temperature sensors, valves, telemetry electronics, flow meters, fluid sensing devices, and combinations thereof.

In some above-described embodiments, the membrane-bearing tubular segment 404 varies in length generally from at least about 10 cm to at most about 2500 m, typically from at least about 10 cm to at most about 1000 m, and more typically from at least about 25 cm to at most about 1000 m. In some such above-described embodiments, each of the electrically-grounded outer upstream membrane electrode 410, the inner downstream membrane electrode 412, and the dielectric filter membrane 411, are of substantially the same length.

In some such above-described embodiments, the dielectric filter membrane 411 is comprised of a material selected from the group consisting of polytetrafluoroethylene (PTFE), polyamides (Nylon), polyimides, polyvinylchloride (PVC), polyolefins, polyesters, and combinations thereof.

In some such above-described embodiments, one or more of the electrically-grounded outer upstream membrane electrode 410, the inner downstream membrane electrode, and the dielectric filter membrane, can additionally be used for purposes other than generating power (e.g., as a sand control device).

In some such above-described embodiments, the at least one electrical lead 406 can span a distance within the wellbore of generally from at least about 1 mm to at most about 10,000 m (there is generally an upper limit that is roughly equal to the length of the well), typically from at least about 1 cm to at most about 5,000 m, and more typically from at least about 1 cm to at most about 1,000 m.

In some such above-described embodiments, the flow of substantially non-conductive hydrocarbon-based fluid 402 comprises a fluid selected from the group consisting of heptanes, diesel, crude oil, mineral oil, combinations thereof, and the like. By way of illustration and not limitation, exemplary such fluids can be those used for methods and systems of a first type (vide supra).

In some such above-described embodiments, the flow of substantially non-conductive hydrocarbon-based fluid 402 possesses a flow rate of generally between about 1 liter/minute and about 55,000 liters/minute, typically between about 1 liter/minute and about 10,000 liters/minute, and more typically between about 10 liters/minute and about 5,000 liters/minute.

Analogous to many system embodiments described above, in some such above-described embodiments electrical potential is harnessed by first charging an electrical storage device (e.g., a battery or capacitor), and then using said electrical storage device to power the at least one device in the at least one device-bearing tubular segment.

In some such above-described embodiments, the system further comprises a telemetry subsystem operable for conveying device-generated data to the surface. While wireless telemetry techniques are preferred, cabled means of communicating data are also contemplated. Additionally or alternatively, in some embodiments recording devices are employed for batch analysis at some later time, wherein the recording devices are removed from the well and analyzed. In some embodiments, the telemetry subsystem and/or the recording device(s) is at least partially powered by means of electrostatic energy generated in the downhole environment.

6. Telemetry Subsystem

The methods and systems described above optionally utilize a telemetry means or subsystem to convey data (obtained in the wellbore) to the surface. While data can be recorded and later brought to the surface for analysis, the conveyance of such data is more often preferably wireless in nature. Such conveyance of data can also be via cabled transmission lines, but such cabled means generally result in the loss of any advantages the wireless powered methods/systems afford. Regardless, real-time data accessibility (whether wireless or cabled) is generally preferable to batch recording and analysis because it permits on-the-fly adaptability.

In some embodiments, where wireless transmission of data is relied upon, such wireless transmission of data can be at least partially provided by mud-based telemetry methods and/or acoustic transmissions. Such techniques are known in the art and will not be described here in further detail. For examples of such mud-based telemetry methods, see, e.g., Kotlyar, U.S. Pat. No. 4,771,408, issued Sep. 13, 1988; and Beattie et al., U.S. Pat. No. 6,421,298, issued Jul. 16, 2002. For examples of wireless transmission of data (and power) up and/or down a well using acoustic transmissions, see, e.g., Klatt, U.S. Pat. No. 4,215,426, issued Jul. 29, 1980; and Drumbeller, U.S. Pat. No. 5,222,049, issued Jun. 22, 1993.

In some embodiments, electromagnetic (EM) transmissions of a type described in, for example, Briles et al., U.S. Pat. No. 6,766,141, issued Jul. 20, 2004, are used to transmit data and/or power into and out of the cased wellbore. The downhole resonant circuits used in such methods and systems can be integrated directly or indirectly with the one or fluid property analyzers, so as to convey information into, and out of, the well. See also, e.g., Coates et al., U.S. Pat. No. 7,636,052, issued Dec. 22, 2009; Thompson et al., U.S. Pat. No. 7,530,737, issued May 12, 2009; Coates et al., U.S. Patent Appl. Pub. No. 20090031796, published Feb. 5, 2009; and Coates et al., U.S. Patent Appl. Pub. No. 20080061789, published Mar. 13, 2008, wherein such "infinite communication" systems and methods are additionally referred to as "INFI-COMM."

7. Summary

The present invention is directed to methods for harnessing flow-induced electrostatic energy in an oil and/or gas well and using this energy to power electrical devices (e.g., flowmeters, electrically-actuated valves, etc.) downhole. The present invention is also directed to corresponding systems through which such methods are implemented.

All patents and publications referenced herein are hereby incorporated by reference to an extent not inconsistent herewith. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed:

1. A method of powering devices in a petroleum well through the generation of electrostatic energy downhole, the petroleum well originating at a geological surface, having variable or non-variable orientation along the length of the well, and comprising a plurality of tubular segments disposed therewithin and connected in series along the well length, said method comprising the steps of:
   a) flowing a substantially non-conductive hydrocarbon-based fluid, as a flowstream, through a designated tubular length that is electrically-isolated from adjacent tubular segments to which it is connected, wherein the non-conductive hydrocarbon-based fluid has a relative permittivity of between 2 and 40, and wherein the designated tubular length comprises a rough-textured surface on at least a portion of its interior surface, wherein the rough-textured surface has an average roughness (Ra) of between 5 μm and 250 μm;

b) generating a net, steady-state electrostatic potential between the flowstream and said designated tubular length;

c) harvesting electrical energy from the electrostatic potential via a ground electrode in electrical contact with the flowstream and an electrical lead in electrical contact with the designated tubular length; and d) using the electrical energy harvested in step (c) to power one or more devices downhole.

2. The method of claim 1, wherein the petroleum well is operable for producing oil, gas, or combinations thereof.

3. The method of claim 1, wherein the substantially non-conductive hydrocarbon-based fluid is selected from the group consisting of (a) an injected fluid, (b) a produced fluid, and (c) combinations thereof.

4. The method of claim 1, wherein the non-conductive hydrocarbon-based flowstream flows past the designated tubular length in a side-pocket mandrel assembly providing for a diverted flowpath.

5. The method of claim 1, wherein the designated tubular length presents itself to the flowstream as a coating of a first type.

6. The method of claim 5, wherein the coating of a first type is substantially non-conductive, and wherein said coating comprises a material selected from the group consisting of polytetrafluoroethylene (PTFE), polyamides (Nylon), polyimides, polyvinylchloride, polyolefins, polyesters, and combinations thereof.

7. The method of claim 1, wherein the designated tubular length is electrically-isolated from adjacent tubular segments to which it is connected by means of a substantially-insulating coating of a second type about at least the regions that are in mechanical contact with the adjacent tubular segments.

8. The method of claim 7, wherein the substantially-insulating coating of a second type is comprised of a material selected from the group consisting of polytetrafluoroethylene (PTFE), polyamides (Nylon), polyimides, polyvinylchloride, polyolefins, polyesters, and combinations thereof.

9. The method of claim 1, wherein the net, steady-state electrostatic potential is at least about 0.5 mV and at most about 50 kV.

10. The method of claim 1, wherein the device deriving power from the harvested electrical energy is selected from the group consisting of one or more of the following: a pressure sensor, a temperature sensor, a valve, telemetry electronics, flow meter, fluid sensing device, and combinations thereof.

11. The method of claim 1, wherein the device draws power from an electrical storage device that is, in turn, charged by the harvested electrical energy.

12. A system for powering devices in a petroleum well through the generation of electrostatic energy downhole, said system comprising:

a) a wellbore originating at a geological surface extending from a surface into a geological formation;

b) a plurality of tubular segments disposed within the wellbore, wherein said tubular segments are useful in conveying hydrocarbon-based fluids out of said wellbore;

c) at least one electrically-isolated tubular segment that is electrically isolated from any adjoining segments, wherein said electrically-isolated tubular segment includes a high friction surface on its interior, wherein the high friction surface has an average roughness (Ra) of between 5 μm and 250 μm;

d) at least one device-bearing tubular segment comprising at least one device that can be usefully employed downhole;

e) at least one electrical lead establishing connectivity between the at least one electrically-isolated tubular segment and the at least one device-bearing tubular segment;

f) a flow of substantially non-conductive hydrocarbon-based fluid, wherein said flow is directed through the tubular segments in an upward direction toward the surface;

g) a ground electrode extending into the flow, wherein an electrical potential exists between the flow and the interior of the electrically-isolated tubular segment, and wherein this electrical potential is harnessed to power at least one device in the at least one device-bearing tubular segment.

13. The system of claim 12, wherein the petroleum well is a multilateral well.

14. The system of claim 12, wherein the electrically-isolated tubular segment presents itself to the flowstream as a substantially non-conductive coating comprised of a material selected from the group consisting of polytetrafluoroethylene (PTFE), polyamides (Nylon), polyimides, polyvinylchloride, polyolefins, polyesters, and combinations thereof.

15. The system of claim 12, wherein the at least one device-bearing tubular segment comprises one or more devices selected from the group consisting of pressure sensors, temperature sensors, valves, telemetry electronics, flow meters, fluid sensing devices, and combinations thereof.

16. The system of claim 12, wherein the flow of substantially non-conductive hydrocarbon-based fluid comprises a fluid selected from the group consisting of heptanes, diesel, crude oil, mineral oil, and combinations thereof 17. The system of claim 12, wherein the flow of substantially non-conductive hydrocarbon-based fluid possesses a flow rate of between about 1 liter/minute to about 5,000 liters/minute.

18. The system of claim 12 further comprising a telemetry subsystem operable for conveying device-generated data to the surface.

19. A method of powering devices in a petroleum well through the generation of electrostatic energy downhole, the petroleum well originating at a geological surface, having variable or non-variable orientation along the length of the well, and comprising a plurality of tubular segments disposed therewithin and connected in series along the well length, said method comprising the steps of:

a) flowing a substantially non-conductive hydrocarbon-based fluid, as a flowstream, through a designated tubular length that is electrically-isolated from adjacent tubular segments to which it is connected, wherein the non-conductive hydrocarbon-based fluid has a relative permittivity of between 2 and 40, wherein the designated tubular length is electrically-isolated from adjacent tubular segments to which it is connected by means of a substantially-insulating coating about at least the regions that are in mechanical contact with the adjacent tubular segments;

b) generating a net, steady-state electrostatic potential between the flowstream and said designated tubular length;

c) harvesting electrical energy from the electrostatic potential via a ground electrode in electrical contact with the flowstream and an electrical lead in electrical contact with the designated tubular length; and
d) using the electrical energy harvested in step (c) to power one or more devices downhole.

20. The method of claim 19, wherein the substantially-insulating coating is comprised of a material selected from the group consisting of polytetrafluoroethylene (PTFE), polyamides (Nylon), polyimides, polyvinylchloride, polyolefins, polyesters, and combinations thereof.

* * * * *